Sept. 19, 1967  W. J. FABREY  3,342,103
SYNCHRONIZING UNIT FOR SOUND AND STILL-PICTURE PRESENTATION
Filed Sept. 7, 1965

WILLIAM J. FABREY
INVENTOR.

BY R. Frank Smith
Robert F. Crocker

ATTORNEYS

_United States Patent Office_

3,342,103
Patented Sept. 19, 1967

3,342,103
SYNCHRONIZING UNIT FOR SOUND AND
STILL-PICTURE PRESENTATION
William J. Fabrey, Rochester, N.Y., assignor to Eastman
Kodak Company, Rochester, N.Y., a corporation of
New Jersey
Filed Sept. 7, 1965, Ser. No. 485,237
16 Claims. (Cl. 88—28)

This invention relates to an apparatus for synchronizing sound and picture presentations, and more particularly to such an apparatus for synchronizing the operation of a slide or other still-picture projector with accompanying audio commentary or other program material.

Arrangements of this general type are well known and normally comprise means for recording, along with the desired program material, a suitable control signal either on the same channel or on a separate channel from that used for the program material. This signal is then subsequently used to initiate a slide-changing operation of the projector.

In those units arranged to record the control signal on the same channel as the audio program material, the control signal must, for practicable purposes, be of such a frequency and of such intensity that it is not particularly objectionable to those watching the program. Such apparatus, of course, also requires a frequency selective means for effectively "sorting out" the control signals from the program material itself. Units which utilize a dual-channel recorder, with the program material recorded on one channel and the control signals on the other, overcome this problem of sorting out the control signals from the program material, but they still require some means for generating the control signals in response to or simultaneously with a slide-changing operation. As a result, the previously known units of both types have been relatively complicated in construction, usually requiring for example a signal generating oscillator and associated power supply, and have very frequently required considerable modification of the slide projector or of the recorder with which they were to be used. By virtue of their complexity, such units have also been unduly expensive.

It is therefore an object of this invention to provide a synchronizing unit for use with a still-picture projector and a conventional sound recorder which avoids the above deficiencies.

In accordance with my invention, a synchronizing unit is provided which may be directly connected to a conventional slide projector and to a dual-channel tape recorder, without modification of either, and which is so arranged that it takes advantage of an A.C. voltage pulse which is inherently present in the slide projector during a slide-changing operation, and utilizes this pulse as a control signal to be recorded on one channel of the tape recorder. The unit further provides circuitry incorporating a relatively few readily available components, preferably including solid state components, which circuitry is responsive to such control signals during playback to effectively initiate a slide-changing operation of the projector.

My invention will be better understood from the following description and claims, especially when considered in the light of the accompanying drawing wherein:

Figure 1:
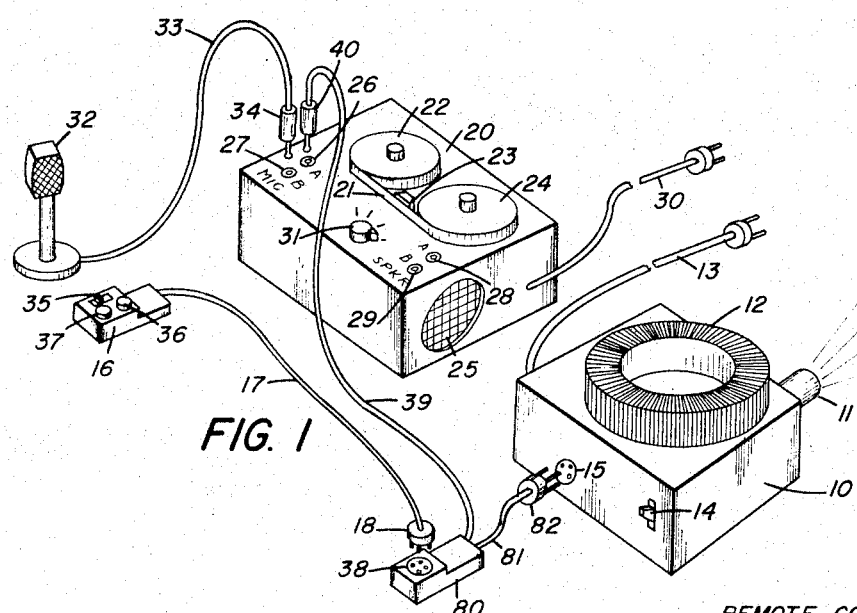
FIG. 1 is a perspective view, somewhat diagrammatic in character, showing the synchronizing unit of my invention as it would be connected to a conventional slide projector and dual-channel tape recorder.

Turning now to FIG. 1, there is shown a slide projector 10, provided with the usual adjustable projection lens assembly 11. The projector is illustrated as being of the known type which utilizes a rotary slide tray 12 which, during slide-changing operations, is adapted to be rotated step by step to bring successive slides into projection position. The projector is provided with the usual line cord 13, adapted to be connected to the conventional source of electrical power, an on-off switch 14 being used to control the operation of the projector. This projector is also provided with a remote control socket 15 to which a remote control unit 16 is adapted to be connected as by means of a cable 17 and plug 18.

My invention is preferably utilized in conjunction with a dual-channel tape recorder of conventional type, one channel of this recorder being used for recording and reproducing any desired program material and the other channel being utilized for recording and reproducing the slide-change signals. While applicant is describing the unit 20 as a tape recorder, it is to be understood that, as is customary, this unit is preferably arranged to both selectively record and reproduce any desired audio program or signal material on either or both channels. Thus the recorder 20 incorporates means (not shown) for feeding a recording tape 21, from a supply reel 22 past a dual-channel recording head 23 to a take-up reel 24. As is quite customary, such recorders normally incorporate a pair of internal speakers, one of which is shown at 25, and also a pair of audio output jacks 28 and 29, one for each channel, by means of which the audio outputs from the two channels may be connected to external amplifiers and/or speakers. Like the projector, the tape recorder is conventionally provided with a line cord 30 for connection to the normal house current and with a function control knob 31 which controls the mode of operation of the recorder. During recording of the program material which is to accompany the slide showing a microphone 32, or other source of program material, is connected by way of a cable 33 and plug 34 to the microphone input jack 27 of one of the channels of the recorder.

As will be explained in more detail below, the remote control unit 16 is provided with a suitable switch means 35 by selective operation of which the lens assembly 11 may be moved in or out to vary the focus, and also with a pair of push-button-actuated switches 36 and 37 to respectively control slide-changing actuation of the projector 10. When switch 36 is pushed, the slide carrier 12 will be rotated one step in the forward direction and a particular slide will be automatically replaced by the next slide in the sequence. Switch 37, on the other hand, causes operation of the projector to change slides in the opposite sense with respect to their normal viewing sequence. The manner in which these results are accomplished wil be explained more completely in conjunction with the discussion of the circuit diagram of FIG. 2.

The synchronizing unit 80 of my invention is effectively inserted between the remote control unit 16 and the projector 10. To this end, unit 80 is provided with a cable 81 and plug 82 adapted to mate with the remote control receptacle 15 of the projector 10. It also carries a socket 38, corresponding in contact arrangement with socket 15, and into which the plug 18 of the remote control unit 16 is adapted to be plugged. The unit 80 also includes a cable 39 provided with a plug 40 which is adapted to be selectively inserted either into the microphone jack 26 of the recorder, during recording of program material, or into the speaker or output jack 28 of that channel during playback of the recorded material during a program presentation.

Figure 2:
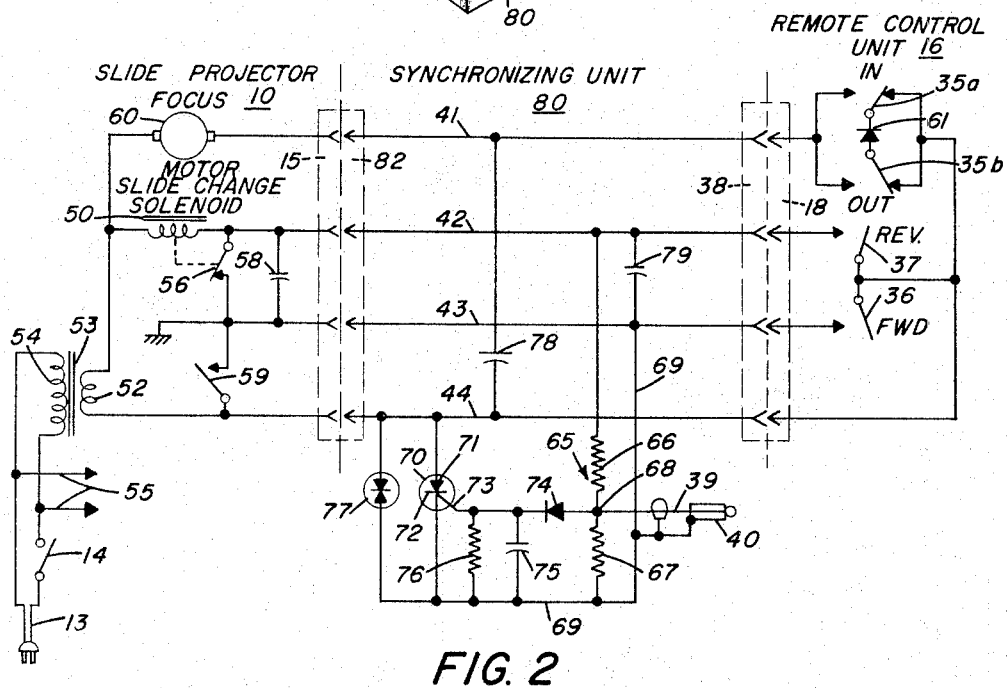
FIG. 2 is a schematic diagram showing the circuitry of my synchronizing unit as well as portions of the circuitry of the slide projector and remote control unit therefor and with which the synchronizing unit is to be utilized.

Turning now to FIG. 2, there is shown at the left-hand side of this figure so much of the circuitry of the slide projector 10 as is necessary to a proper understanding of the present invention. Similarly, at the right-hand side of this figure is shown the circuitry of the remote control unit 16 normally used with such a projector. Between the two is the circuitry of the synchronizing unit 80. As is shown in FIG. 2, the corresponding contacts of plug 32 and socket 38 of synchronizing unit 80 are directly connected to one another internally of the synchronizing unit by leads 41–44 respectively so that, even when the synchronizing unit is connected as described above, the remote control unit is operatively connected to the slide projector in exactly the same way that it would be if it were directly connected thereto by having plug 18 inserted directly into the socket 15 on the projector 10.

It is believed that the invention will be best understood by considering first the circuitry of the slide projector and of the remote control unit independently of the synchronizing unit. The slide-changing mechanism of the projector 10 is preferably of the type disclosed and claimed in the copending U.S. patent application of Robinson and Di Pietro, Ser. No. 336,034, filed May 8, 1964, now Patent No. 3,276,908. Reference may be made to the above application for a complete detailed description of such slide-changing mechanism. It will however suffice for the present case, to point out that this mechanism includes a solenoid 50, the energization of which trips a single revolution clutch (not shown) to release mechanical means (not shown) which actually changes the slide and advances the slide tray. The arrangement is such that if the solenoid 50 is energized but momentarily, the slide-changing mechanism will advance the tray in a forward direction relative to the normal slide sequence; if the solenoid 50 is held energized for an appreciably longer period of time, the movement of the slide carrier 12 and the resulting change of slides will be in the reverse sense.

The direction of advance of the slide tray is controlled by the selective operation of the forward switch 36 or the reverse switch 37 on the remote control unit 16. Current for energizing the solenoid 50 is supplied by the secondary winding 52 of a transformer 53, the primary 54 of which is connected by way of on-off switch 14 to the line cord 13, which as previously described is plugged into the usual supply of 120 volt, 60-cycle house current. Conveniently, but not necessarily, transformer 53 may be constituted by appropriate windings on a motor used for driving a cooling fan in the projector. Leads 55 may be used to supply the other electrical apparatus incorporated in the projector 10, such as the usual projection lamp (not shown).

Considering first the operation of the solenoid 50 for reverse slide-changing operation, it can be seen that upon closing of the reverse switch 37 a circuit is completed from the secondary winding 52 by way of lead 44, switch 37, lead 42 and solenoid 50 to the opposite side of transformer winding 52. Solenoid 50 will thereupon be energized and will remain energized as long as switch 37 is held closed to produce the desired one or more slide changes in the reverse sense.

To automatically obtain the momentary energization of solenoid 50 needed to initiate a single forward slide-changing cycle a normally-closed pair of contacts 56 are interposed between line 43, from forward switch 36, and solenoid 50. As explained in detail in the above-mentioned application, switch contacts 56 are arranged to be opened by the act of tripping the one-revolution clutch upon energization of solenoid 50. Thus, when switch 36 is closed, a circuit will be completed by way of line 44, switch 36, line 43 and switch contacts 56, to the solenoid 50 to energize the latter. However as soon as the clutch has been tripped by the solenoid, contacts 56 will open to deenergize the circuit through the solenoid. As previously explained this will result in a forward movement of the slide tray 12.

Projector 10 also preferably incorporates a capacitor 58 shunting contacts 56 so as to prevent undue arcing thereof. As is customary with many slide projectors, projector 10 is also preferably provided with a timer-controlled switch 59 which is effectively connected in parallel with the forward switch 36. As is evident from the drawing, when this switch is operated by suitable timing mechanism (not shown), a forward slide-changing operation will occur just as if switch 36 had been manually closed.

As previously mentioned, slide projector 10 is also provided with a remotely controllable focusing means. Such focusing means may conveniently comprise a conventional D.C. type, polarity sensitive motor 60, the direction of rotation of which depends upon the polarity of the D.C. current supplied thereto. This motor is connected by suitable mechanical means (not shown) so as to move the lens assembly in or out, as the case may be. To selectively control such operation of motor 60, the above-mentioned switch means 35 is provided on the remote unit 16.

As shown at the right-hand side of FIG. 2, switch means 35 may conveniently comprise a pair of single-pole, double-throw switches 35a and 35b, with a rectifier 61 connected therebetween. Normally both switches are in the position shown in FIG. 2. When switch means 35 is moved in one direction, it will reverse the contacts of switch section 35a, for example, so that a circuit will be completed from the transformer winding 52 through the normally closed contact of switch 35b, the diode rectifier 61, the switch section 35a, and line 41 to the focus motor 60, the polarity of the resulting pulsating voltage being such as to cause the focus motor to rotate in such direction as to move the lens assembly inward. If switch 35 is moved in the opposite direction, the diode 61 will be effectively inserted in this circuit in the opposite polarity direction, so that the effective direct current polarity of the voltage applied to focus motor 60 will be reversed, causing the latter to rotate in the direction to move the lens assembly outward.

Turning now to the circuitry of the synchronizing unit itself, there is shown, connected between the lead 42 and the grounded lead 43 therein, a voltage divider 65 formed by a pair of resistors 66 and 67 of relatively high and low impedance respectively. It will be noted that this voltage divider is effectively in shunt with the contacts 56 in the projector, so that whenever these contacts 56 are opened, any voltage appearing thereacross will appear also across the voltage divider 65. That portion of such voltage which appears across the low impedance section 67 of the divider 65 serves as the slide-change signal which is to be recorded on the tape for future use for automatically initiating slide-change operations. The junction 68 between resistors 66 and 67 and the grounded line 69 therefore serve as slide-change signal terminals. These terminals are connected by way of cable 39 to the previously mentioned plug 40 which, during recording, is inserted in the microphone jack 26 of the recorder 20. The total impedance of voltage divider 65 should be sufficiently high that current flow therethrough will be below that needed to energize, or to hold energized, solenoid 50.

Considering now what happens when a normal, forward slide-changing operation is initiated during a program-recording session, closing of forward switch 36 will complete a circuit to cause a momentary energization of the solenoid 50, tripping the above-mentioned one-revolution clutch, which thereupon opens contacts 56 as above described to interrupt the circuit. Switch 36 will, however, ordinarily still be held closed by the operator, and as a result, a 60-cycle voltage will appear across the open contacts 56. The portion of this voltage appearing across the resistor 67 of the voltage divider will be applied by way of cable 39 to the microphone input terminals of the recorder 20 and be recorded on the control channel of the tape 21 as a slide-change signal. Thus it can be seen that with this arrangement, no separate source of slide-changing signal is required, such signal being derived from the projector itself, without any modification of the latter.

While the exact values involved may vary, the resistors 66 and 67 should be so chosen that the amplitude of the voltage appearing at the signal terminals will be within the normal recording range used with conventional tape recorders. I have found that a slide-change signal amplitude of approximately 30 millivolts is quite effective for this purpose.

According to the invention, the synchronizing unit 80 also includes circuitry which, when plug 40 is inserted in the audio output jack 28 of recorder 20 and the latter is set for playback conditions, will respond to previously recorded slide-change pulses and initiate corresponding operation of the slide-change mechanism in the projector 10. To this end, the synchronizing unit is provided with a silicon controlled rectifier 70, the anode 71 of which is connected to line 44 and the cathode 72 of which is connected to the grounded line 69. Thus it will be seen that the silicon controlled rectifier 70 is connected effectively in shunt with the forward control switch 36 of the remote control unit.

As is well known, such silicon controlled rectifiers are normally nonconducting, but will be rendered conductive upon the application of a low positive potential to the control gate 73 of the rectifier. Once thus rendered conductive, the silicon controlled rectifier will continue to conduct until its anode voltage drops substantially to or below that on its cathode. In order to make control gate 73 responsive to a signal played back by the recorder 20, the terminal 68 of voltage divider 65 is connected through a diode 74 to a capacitor 75 so arranged that the latter will be charged up to approximately the positive peak value of the playback control signal. As soon as the voltage on capacitor 75 charges up to the required triggering level for silicon controlled rectifier 70, the latter will be made conductive and will pass a half-wave-rectified or pulsating D.C. current to solenoid 50 by way of the circuit extending from one side of winding 52, line 44, silicon controlled rectifier 70, line 69, line 43, contacts 56, solenoid 50 and back to the other side of the winding 52. This will energize solenoid 50, tripping the slide-changing which, as before, will cause the opening of contacts 56, interrupting this circuit. Thus solenoid 50 will once again be but momentarily energized and will accordingly cause the slide projector to change slides in the desired, forward direction. While a small portion of this pulsating voltage will appear across resistor 67 of voltage divider 65 upon the opening of contacts 56, the level of this voltage will be so low as to not affect the operation, and moreover will be of such polarity that it will be blocked by diode 74 from affecting the charge on capacitor 75.

The usual resistor 76 is connected from gate 73 of silicon controlled rectifier 70 to ground, to bleed off any charge thereon during non-conducting periods. This resistor also assures that capacitor 75 will discharge promptly upon the termination of the signal pulse applied to terminal 68. Thus the voltage on the gate 73 of silicon controlled rectifier 70 will return to ground potential shortly after the termination of the reproduced control pulse, well before the completion of the actual slide change cycle.

Although not necessary for normal operation of the synchronizing unit, the latter is preferably provided also with a thyrector 77 connected in parallel with silicon controlled rectifier 70; a capacitor 78, connected between lines 41 and 44; and a capacitor 79 connected between lines 42 and 43. Thyrector 77 and capacitors 78 and 79 are for the purpose of protecting the silicon controlled rectifier against damage and for preventing the generation of false slide-changing signals, or triggering of the silicon controlled rectifier 70 due to switching transients such as may occur upon actuation of the focus control switch 35, for example. A value of .01 mfd. for capacitor 78, and a value of .05 mfd. for capacitor 79, have been found to be effective for this purpose.

As to the values of the active components of the synchronizing unit itself, when used with a projector wherein the voltage across the winding 52 is approximately 24 volts, 60-cycle A.C., a value of 150 kilohms for resistor 66, and of 180 ohms for resistor 67, have been found effective to provide the desired slide-change signal amplitude at the signal terminals 68, 69. A value of 100 mfd. for capacitor 75 and of 1 kilohm for resistor 76 have likewise been found to provide satisfactory triggering of the silicon controlled rectifier 70 in response to each reproduced slide-change signal from recorder 20. With a silicon controlled rectifier which requires approximately .6 volt positive bias with respect to its anode in order to trigger it to a conducting condition, a voltage level of approximately 2 volts, peak value, for the reproduced signal has been found to be more than adequate to give proper triggering. Obviously the values of these resistors and capacitors may vary greatly depending upon the particular projector/recorder combination is utilized, but the above values have been found most adequate with a projector of the type described above, used in conjunction with many different commercially available tape recorders.

The various resistors, capacitors, and solid state devices used in the synchronizing unit are each relatively small in size and, as a result, the entire unit may be made extremely small and compact. Moreover the components are relatively low-priced and readily available so that the unit itself may likewise be correspondingly low in price.

Summarizing briefly the operation of the synchronizing unit in conjunction with the projector 10 and recorder 20 during a recording session, the slides will be arranged in the proper sequence in the slide tray 12 and the recorder 20 will be set for recording. The microphone 32 or other source of program material will be connected to the microphone input jack of one channel and the plug 40 of the synchronizing unit 80 will be inserted in the microphone jack of the other channel of the recorder. The desired program material corresponding to each slide will thereupon be recorded simultaneously with the projection of that slide. Whenever the operator desires to change slides he will press the forward slide-change button 36 to initiate a slide-changing operation. At the same time, a slide-change signal will be automatically produced at terminals 68, 69 of the synchronizing unit and will be applied through cable 39 and plug 40 to the recorder and be recorded on the signal channel of the tape 21. This operation will be repeated for each slide.

When, later, it is desired to produce a slide program in conjunction with the program material recorded on tape 21, the recorder will be set for playback, the plug 40 will be shifted to the speaker or audio output jack 28 of the control channel and the recorder set to play back the tape. Each time a previously-recorded slide-change signal is reproduced by the recorder, it will trigger the silicon controlled rectifier 70 in the synchronizing unit, which, as previously described, will initiate a forward slide-changing operation of the projector 10. Thus the operation of the projector 10 will be controlled by and synchronized with the sound tape 21.

It should be noted that use of the synchronizing unit 80 in no way affects the operation of the remote control unit. Whether or not the projector is connected for operation by the recorded signals on the tape 21, the manual controls 36 and 37 may be used to independently control forward or reverse slide changes and the switch means 35 operated to focus the projector without any difficulty. It might also be mentioned that, during a recording session, only a forward slide-change will cause a slide-change signal to be recorded. No appreciable voltage appears across divider 65 at any time during a reverse slide-change operation under the control of reverse switch 37.

From the above, it can be seen that this invention provides an extremely simple, inexpensive, but nevertheless reliable means for correlating the operation of a conventional slide projector with that of a conventional tape recorder, and at the same time accomplishing this result without requiring any modification of either.

While but one form of the invention has been shown in the accompanying drawings, it will be obvious to one skilled in the art that many changes can be made without departing from the spirit and scope of the invention as defined by the appended claims.

I claim:
1. In combination with a slide projector of the type having electrically controllable slide-changing mechanism,
   a slide-change control circuit for initiating a slide-changing operation of said mechanism,
   said control circuit including a circuit component across which a voltage is developed during such operation of said mechanism,
   a signal recorder having signal input terminals,
   and means for connecting said signal input terminals to said circuit component so that at least a portion of said voltage appearing across said component will be recorded by said recorder as a slide-change signal.
2. The invention according to claim 1,
   said connecting means including a voltage divider shunting said circuit component,
   and said terminals being connected across a predetermined portion of said voltage divider.
3. The invention according to claim 1, said voltage being of a cyclically varying character whereby said slide-change signal will correspondingly vary cyclically.
4. In combination with a slide projector of the type having electrically controllable slide-changing mechanism,
   including electro-mechanical means responsive to a predetermined current flow therethrough for initiating a slide-changing operation,
   and an energizing circuit including a voltage source,
   said circuit being operative upon completion thereof to produce such current flow through said electro-mechanical means,
   said circuit including a normally closed pair of switch contacts in series with said electro-mechanical means,
   said contacts being arranged to be opened in response to initiation of a slide-changing operation by said means, to deenergize said circuit,
   slide-change signalling means comprising
   a pair of signal terminals,
   and means connecting said terminals to said switch contacts whereby at least a portion of the voltage appearing across said contacts upon opening thereof in response to each such slide-changing operation will appear at said signal terminals.
5. The invention according to claim 4,
   said energizing circuit including a normally open control switch for completing said circuit to initiate a slide-changing operation,
   and normally non-conductive, signal-controlled switch means shunting said control switch,
   said signal-controlled switch means being rendered conductive in response to a predetermined signal voltage at said signal terminals to initiate a slide-changing operation independently of said control switch.
6. The invention according to claim 5, further including
   means for selectively connecting said signal terminals to the audio input and output terminals of sound recording and reproducing apparatus.
7. In combination with a slide projector of the type having electrically controllable slide-changing mechanism,
   including electro-mechanical means responsive to a predetermined current flow therethrough for initiating a slide-changing operation,
   and an energizing circuit including a source of cyclically varying voltage,
   said circuit being operative upon completion thereof to produce such current flow through said electro-mechanical means,
   said circuit including a normally closed pair of switch contacts in series with said electro-mechanical means,
   said contacts being arranged to be opened in response to initiation of a slide-changing operation by said means, to deenergize said circuit,
   and with recording apparatus having audio input terminals,
   a control unit for correlating the operation of said slide projector and said recording apparatus,
   said unit comprising a pair of slide-change signal terminals,
   means for connecting said signal terminals to said switch contacts whereby at least a portion of the voltage appearing across said contacts upon opening thereof in response to each such slide-changing operation will appear at said signal terminals,
   and means for connecting said signal terminals to said audio input terminals of said recording apparatus.
8. The invention according to claim 7,
   said means for connecting said signal terminals to said switch contacts including a relatively high impedance voltage divider connected in shunt with said contacts,
   said signal terminals being connected across a relatively low-impedance portion of said divider.
9. In combination with a slide projector of the type having electrically controllable slide-changing mechanism,
   including electro-mechanical means operable upon energization thereof to initiate a slide-changing operation of said mechanism,
   and an energizing circuit including a source of cyclically varying voltage,
   a normally open slide-change control switch,
   and a normally closed pair of contacts arranged to be opened in response to the initiation of a slide-changing operation of said mechanism,
   said switch and said contacts being connected in said circuit in series with said electro-mechanical means whereby respectively to control energization and de-energization of said electro-mechanical means,
   and with recording and reproducing apparatus having audio input and output terminals,
   a control unit for correlating the operation of said slide projector and said recording and reproducing apparatus,
   said unit comprising a pair of slide-change signal terminals,
   and a normally non-conductive, electrically-controlled switch means having control means operatively responsive to a predetermined signal voltage at said signal terminals to render said electrically-controlled switch means conductive,
   means for connecting said signal terminals to said contacts on said projector whereby at least a portion of the cyclically varying voltage from said source, appearing across said contacts upon opening thereof in response to a slide-changing operation will appear as a slide change signal at said signal terminals,
   means for connecting said electrically-controlled switch means in shunt with said slide-change control switch on said projector,
   and means for selectively connecting said signal terminals to the audio input and output terminals of said sound recording and reproducing apparatus whereby, respectively to record slide-change signals in response to actuation of said projector slide- change control switch or to initiate slide-changing operation of said projector slide-changing mechanism in response to reproduction of such recorded slide-change signals by said recording and reproducing apparatus.

10. The invention in accordance with claim 9, said electrically-controlled switch means comprising a silicon controlled rectifier having anode, cathode and control electrodes,
said anode and cathode electrodes being connected in said shunting relationship with said slide-change control switch,
and said control electrode being responsive to said predetermined signal voltage to render the anode-cathode path of said rectifier conductive.

11. The invention in accordance with claim 10, the voltage from said source being alternating current voltage, whereby said controlled-rectifier upon being rendered conductive in response to said predetermined signal voltage will be restored to non-conductive condition during each alternating current cycle.

12. The invention in accordance with claim 11, including a diode and a capacitor connected in series across said signal terminals, said control electrode controlling the conductivity of said controlled rectifier in accordance with the potential across said capacitor.

13. A synchronizing unit for correlating the operation of a slide projector and a separate sound recording and reproducing apparatus, said unit comprising
input, output, and signal terminals,
a voltage divider connected between the input terminals,
said signal terminals being connected across a predetermined portion of said voltage divider,
normally non-conducting, electrically-controlled switch means connected between said output terminals,
said switch means including a control element operatively responsive to a predetermined signal level at said signal terminals to render said switch means conductive,
and means for detachably connecting said input and output terminals to a slide projector and said signal terminals to a sound recording and reproducing apparatus.

14. The invention of claim 13,
said switch means being a silicon controlled rectifier having its anode and cathode connected between said output terminals and including a control electrode constituting said control element,
and means connecting said control electrode and said cathode across a section of said voltage divider whereby a predetermined voltage across said section will render the anode-cathode path of said rectifier conductive.

15. The invention of claim 14 wherein said last mentioned connecting means includes
a capacitor connected between said control electrode and said cathode,
a diode connected between said control electrode and one end of said section of said voltage divider, and a connection from said cathode to the other end of said section.

16. A synchronizing unit for correlating the operation of
(a) a slide projector of the type having electrically controllable slide-changing mechanism including a slide-change control switch for initiating a slide-changing operation thereof and a circuit component across which a voltage appears as a result of such initiation by said switch, and
(b) sound recording and reproducing apparatus, separate from said projector, and of the type including audio input and output terminals for use respectively during recording and reproducing operations of said apparatus,
said synchronizing unit being separate from both said projector and said sound apparatus and comprising:
normally non-conductive electrically-controlled switch means having a control element operative in response to a predetermined energization thereof to render said electrically-controlled switch means conductive,
a voltage divider,
means for detachably connecting said unit to a projector of the said type, with said electrically-controlled switch means and said voltage divider in shunt respectively, with the slide-change control switch and the circuit component of such projector,
means for detachably connecting said unit selectively to the input or output terminals of sound apparatus of the said type, with a predetermined portion of said voltage divider connected in shunt with the selected terminals,
and means connecting said voltage divider to the control element of said electrically-controlled switch means,
whereby, during recording, said unit will be effective to transmit a portion of the voltage appearing across the circuit component of such projector to such recorder for recording thereon as a slide-change signal,
and, during playback operation of such recorder, said unit will be responsive to the reproduction of previously recorded slide-change signals to render said electrically-controlled switch means conductive to initiate a slide-changing operation of said projector.

References Cited

UNITED STATES PATENTS

| | | | |
|---|---|---|---|
| 2,975,672 | 3/1961 | Shields | 88—28 |
| 2,985,069 | 5/1961 | Sampson | 352—17 |
| 3,026,769 | 3/1962 | Thiele | 88—28 |
| 3,110,216 | 11/1963 | Chalfin | 88—28 |
| 3,177,767 | 4/1965 | Templeman | 88—28 |
| 3,233,510 | 2/1966 | Harrison et al. | 88—28 |
| 3,245,156 | 4/1966 | Bloois et al. | 88—28 |

NORTON ANSHER, *Primary Examiner.*

R. M. SHEER, *Assistant Examiner.*